United States Patent
Gillies et al.

(10) Patent No.: US 11,976,237 B2
(45) Date of Patent: May 7, 2024

(54) ALKALI-SILICA REACTION FOR EXPANDING CEMENT IN A WELLBORE

(71) Applicant: Halliburton Energy Services, Inc., Houston, TX (US)

(72) Inventors: James Gillies, Kaula Lumpur (MY); Samuel J. Lewis, Spring, TX (US); Thomas Jason Pisklak, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/497,334

(22) Filed: Oct. 8, 2021

(65) Prior Publication Data
US 2023/0113192 A1 Apr. 13, 2023

(51) Int. Cl.
*E21B 33/14* (2006.01)
*C04B 28/26* (2006.01)
*C09K 8/46* (2006.01)

(52) U.S. Cl.
CPC ............... *C09K 8/46* (2013.01); *C04B 28/26* (2013.01); *E21B 33/14* (2013.01)

(58) Field of Classification Search
CPC .................................. C09K 8/46; E21B 33/14
USPC ........................................................ 166/285
See application file for complete search history.

(56) References Cited

U.S. PATENT DOCUMENTS

| 5,810,921 A | 9/1998 | Baxter et al. |
| 7,413,602 B2 | 8/2008 | Grasso, Jr. et al. |
| 2007/0199721 A1 | 8/2007 | Givens et al. |
| 2013/0139727 A1* | 6/2013 | Constantz ............... C04B 11/00 106/656 |
| 2013/0255542 A1* | 10/2013 | Clodic ..................... C04B 7/32 106/695 |
| 2014/0116776 A1 | 5/2014 | Marx et al. |
| 2015/0300151 A1 | 10/2015 | Mohaghegh |
| 2017/0121587 A1 | 5/2017 | Allouche et al. |

(Continued)

FOREIGN PATENT DOCUMENTS

| EP | 0254342 | 1/1988 |
| JP | 2013216507 A | 10/2013 |

(Continued)

OTHER PUBLICATIONS

Columbia University, "Glass Concrete", Concrete Materials Research, as early as Jun. 14, 2021, 3 pages.

(Continued)

*Primary Examiner* — William D Hutton, Jr.
*Assistant Examiner* — Ashish K Varma
(74) *Attorney, Agent, or Firm* — Kilpatrick Townsend & Stockton LLP

(57) ABSTRACT

A method may comprise operations for expanding a cement mixture with an alkali-silica reaction. The method may include positioning a cement mixture around a casing string downhole in a wellbore. The cement mixture may include a cement material and a silica material. The method may include curing the cement material to cause the cement material to contract. The silica material and alkali in the cement material may undergo an alkali-silica reaction to produce a gel that expands the cement mixture. The rate of expansion of the cement mixture from the gel may be equal to or greater than the rate of contraction of the cement mixture from curing.

20 Claims, 5 Drawing Sheets

(56) References Cited

U.S. PATENT DOCUMENTS

| | | | |
|---|---|---|---|
| 2017/0137694 A1 | 5/2017 | van Oort et al. | |
| 2018/0204139 A1 | 7/2018 | Burch et al. | |
| 2019/0177222 A1* | 6/2019 | Dighe | C04B 14/062 |
| 2020/0299202 A1 | 9/2020 | Choi et al. | |
| 2021/0363403 A1* | 11/2021 | Pisklak | E21B 33/14 |

FOREIGN PATENT DOCUMENTS

| | | |
|---|---|---|
| WO | 9839266 A1 | 9/1998 |
| WO | 2019173841 A1 | 9/2019 |

OTHER PUBLICATIONS

US Department of Transportation, "Alkali-Aggregate Reactivity (AAR) Facts Book", Federal Highway Administration, Report No. FHWA-HIF-13-019, Mar. 2013, 82 pages.
International Application, International Search Report and Written Opinion, PCT/US2021/046880, Apr. 20, 2022, 9 pages.
International Application, International Search Report and Written Opinion, PCT/US2021/054211, Jun. 16, 2022, 11 pages.

* cited by examiner

ALKALI-SILICA REACTION FOR EXPANDING CEMENT IN A WELLBORE

TECHNICAL FIELD

The present disclosure relates generally to wellbore completion operations and, more particularly (although not necessarily exclusively), to using an alkali-silica reaction to expand cement in a wellbore or reduce an extent of cement contraction in a wellbore during curing.

BACKGROUND

During completion of a wellbore, a casing string may be cemented to seal and fix the casing string in the wellbore. During a curing process, some cements, such as portland based cements, may exhibit volumetric shrinkage due to hydration. The volumetric shrinkage may result in the formation of micro-annuli and reduced shear bond strength between the casing string and the cement, causing the cement to have poor zonal isolation. In some cases, oil and gas produced in the wellbore may migrate through the micro-annuli.

DETAILED DESCRIPTION

Figure 1:
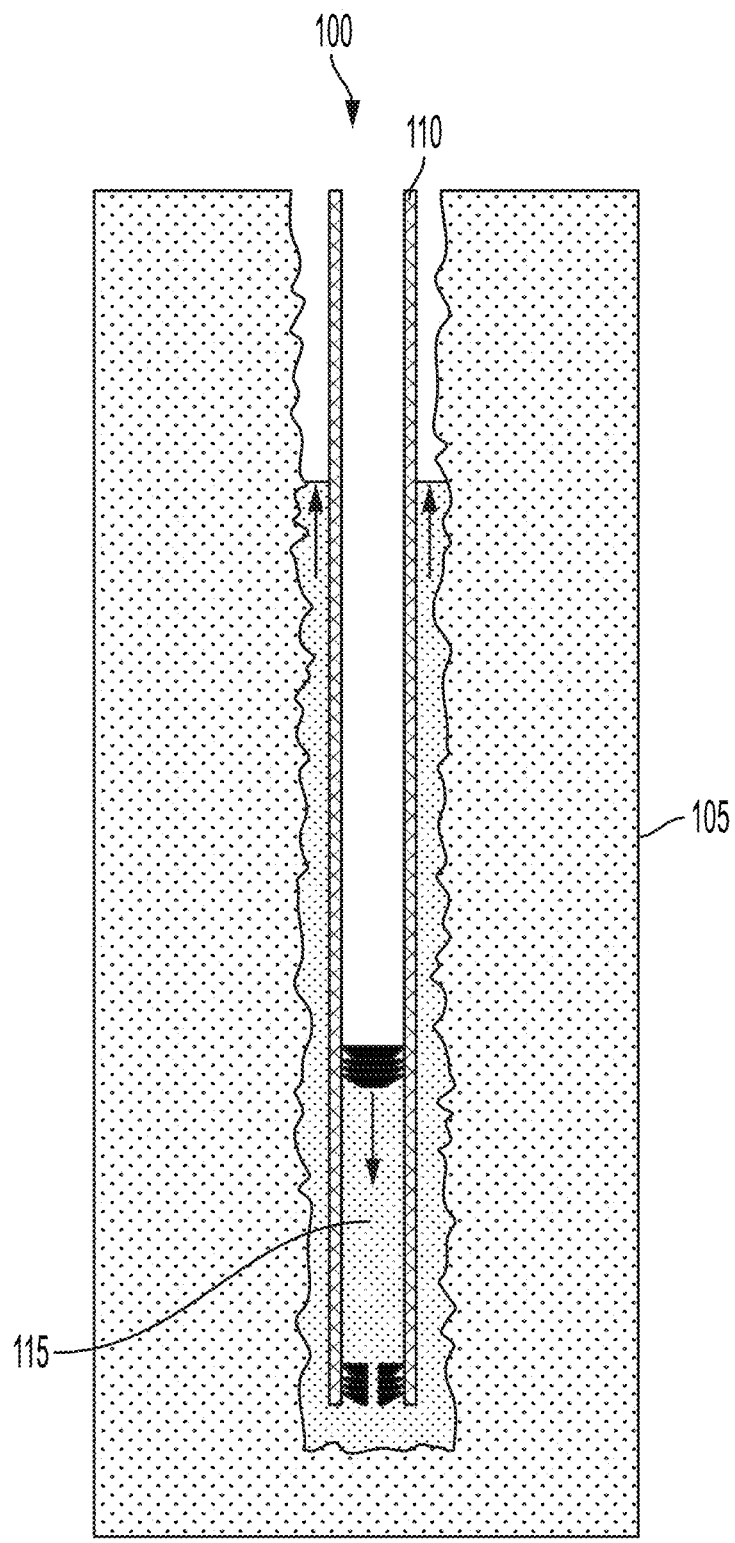
FIG. 1 is a schematic of a wellbore in which a completion operation is occurring according to one example of the present disclosure.

Certain aspects and examples of the present disclosure relate to controlling the expansion of cement in a wellbore via an alkali-silica reaction ("ASR"). Many cement mixtures used in completion operations in wellbores experience shrinkage during the curing process. Wellbore completion may include processes associated with preparing a well in a subterranean formation for production of hydrocarbons. Examples of preparing the well for production include installing, sealing, or fixing a casing in place within the wellbore using a cement mixture or sealing or isolating lost-circulation zones. Adding a silica material to the cement mixture may prevent issues related to cement shrinkage by creating a non-zero expansion of the cement mixture as the alkali in the cement reacts with the silica material by way of an ASR. The ASR may produce a gel surrounding silica particles that may expand. The expansion due to the gel may be greater than the shrinkage caused by the curing process, preventing the formation of micro-annuli in the cement. Controlling the size of the silica particles may be beneficial for expanding the cement at a desired rate. ASR expansion in cement plugs may be beneficial as prevention of shrinkage in cement plugs is becoming mandatory in many areas. The use of silica material may be environmentally advantageous, as the silica material may optionally comprise or include recycled glass, which is a waste product. Additionally, adding recycled glass to the cement mixture may lower the embedded energy content of the cement per unit volume.

In some examples, the rate of expansion due to ASR in cement mixtures can be controlled by varying the size, concentration, and aggregation of the silica material. These parameters can be controlled within certain ranges to produce the desired expansion of the cement, without over-expanding and damaging the cement. In some examples, the size of the silica particles may be useful for controlling cement expansion. For example, small particles, such as those presently used for strength retrogression or pozzolanic enhancement, may react too quickly and at such a small scale that other reactions may dominate the interaction between cement material and silica material. In other examples, large particles may create greater amounts of gel that can cause spelling of the cement. Silica particles may have many suitable sizes, such as a diameter or cross-sectional dimension of 100 μm to 2 mm, or any value within this range, e.g., a D50 diameter or a D50 cross-sectional dimensions. Example D50 diameters or D50 cross-sectional dimensions may range from 100 μm to 200 μm, from 200 μm to 400 μm, from 400 μm to 600 μm, from 600 μm to 800 μm, from 800 μm to 1.0 mm, from 1.0 mm to 1.2 mm, from 1.2 mm to 1.4 mm, from 1.4 mm to 1.6 mm, from 1.6 mm to 1.8 mm, or from 1.8 mm to 2.0 mm. The concentration of the silica particles may also change the rate of expansion. The silica particles may be present in the cement mixture in various concentrations, such as between 1 to 50% by weight of cement, or any value within this range. For example, a preferred range by weight of cement may be between 10 and 20%. Example concentration of the silica particles may be from 1% to 5% by weight of cement, from 5% to 10% by weight of cement, from 10% to 15% by weight of cement, from 15% to 20% by weight of cement, from 20% to 25% by weight of cement, from 25% to 30% by weight of cement, from 30% to 35% by weight of cement, from 40% to 45% by weight of cement, or from 45% to 50% by weight of cement.

In some examples, the rate of expansion due to ASR in cement mixtures can also be controlled by varying the shape of the silica particles. For example, minimizing the surface area of the silica particles may decrease the amount of gel that can cause expansion of the cement mixture. Silica particles with spherical or semi-spherical may be used to minimize surface area, but any other shape of particle may be used, including non-spherical shapes. Changing a surface area, a cross-sectional shape, a sphericity or a length-to-width ratio of the silica particles may allow for further control of the rate of expansion. Alternatively or additionally, porous silica particles may be included to increase surface area and gel production, and may therefore increase the rate of expansion. A porosity of the particles may range from 0% porous to 50% porous, or more. In some examples, a porosity of the particles may be from 0% to 10%, from 10% to 20%, from 20% to 30%, from 30% to 40%, or from 40% to 50%. In some examples, a length-to-width ratio of the silica particles may range from 1:1 to 50:1, such as from 1:1 to 5:1, from 5:1 to 10:1, from 10:1 to 20:1, from 20:1 to 30:1, from 30:1 to 40:1, or from 40:1 to 50:1. As another example, a surface area characteristic of a silica particles may be represented by a sphericity, where a sphericity of 1 represents a spherical particle. In some examples, the silica particles may have a sphericity of from 0.2 to 1.0, such as from 0.2 to 0.3, from 0.3 to 0.4, from 0.4 to 0.5, from 0.5 to 0.6, from 0.6 to 0.7, from 0.7 to 0.8, from 0.8 to 0.9, or from 0.9 to 1.0. The more particles differ in shape from a sphere, the more their surface area may increase as compared to a sphere, providing additional reaction sites for ASR. Accordingly, by using particles of lower sphericity in a cement mixture, the amount of expansion due to ASR can be increased.

In some examples, the color and/or metal content of the silica particles may also be used to control the rate of expansion. In some cases, the color of the silica particle may be dependent on the metal content of the silica particle. For example, silica particles that are lighter in color or clear may be more effective at increasing the rate of expansion than silica particles that are amber or green (which may be due to the presence of metals such as chromium or iron in the silica particle). A metal content in the silica particles may impact a rate at which ASR occurs. In some examples, additional materials may be included in the cement mixture to aid in controlling the rate of expansion. For example, volcanic ash or fly ash may be added to the cement mixture.

Examples of silica material can include silica lime glass, borosilicate glass, volcanic glass, rhyolitic glass, dacitic glass, latitic glass, andesite glass, cryptocrystalline devitrification products, siliceous glass, synthetic siliceous glass, crystalline silica, quartz, opal, chalcedony, cristobalite, tridymite, opaline cherts, chalcedonic cherts, quartzose cherts, siliceous limestones, rhyolites and tuffs, dacites and tuffs, andesite and tuffs, siliceous shales, opaline concretions, siliceous dolomites, phyllites, or any combination of these. Optionally, the silica material may comprise quartz in the form of sand or frac sand.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of a wellbore 100 in which a completion operation is occurring according to one example of the present disclosure. The wellbore 100 can extend through various earth strata and can extend through or to a hydrocarbon bearing subterranean formation 105. Although the wellbore 100 depicted in FIG. 1 is substantially vertical, other orientations for sections of the wellbore 100 can be used, including curved, angled, or substantially horizontal. The wellbore 100 includes a casing string 110. A cement mixture 115 is used to fix the casing string 110 in place within the wellbore 100 as part of a completion operation. As illustrated, the cement mixture 115 is directed downhole within the casing string 110 using a pair of wiper plugs to force the cement mixture 115 into an annular space between the wellbore 100 and the casing string 110.

The cement mixture 115 can comprise a cement slurry and a silica material. By including the silica material within the cement mixture 115, aspects of the above features can be achieve, as will be described in more detail below.

Although FIG. 1 shows a single casing string 110, multiple casing strings can be used within the wellbore 100, such as a surface casing string, an intermediate casing string, or a production casing string. In some cases, a liner suspended from inside the bottom of another casing string may be used. Further, cement mixtures 115 can be used for wellbore completion operations other than cementing a casing string 110 or for other wellbore operations. As examples, resins and polymers may also be used in the cement mixture 114, such as for lost circulation material, as part of a cement sheath, for remediating an existing cement sheath, or the like.

In some examples, a cement component (e.g., portland cement) in the cement mixture 115 and/or the cement mixture 115 itself may contract during curing. As noted above, including silica material in the cement mixture 115 may be useful for accommodating or otherwise counteracting the contraction of the cement mixture 115 during curing. For example, the presence of the silica material may react with alkali in the cement mixture, causing an ASR that may produce a gel surrounding the silica particles. The gel may expand to at least partially counteract the contraction of the cement mixture 115.

In some examples, the silica material may be included in the cement mixture 115. The silica material may be homogeneously distributed within the cement mixture 115 to ensure even expansion of the cement mixture 115. The ASR to produce the gel may be triggered by the addition of mix water used to cure the cement. Alternatively, the silica material may be included in the mix water.

Figure 2:
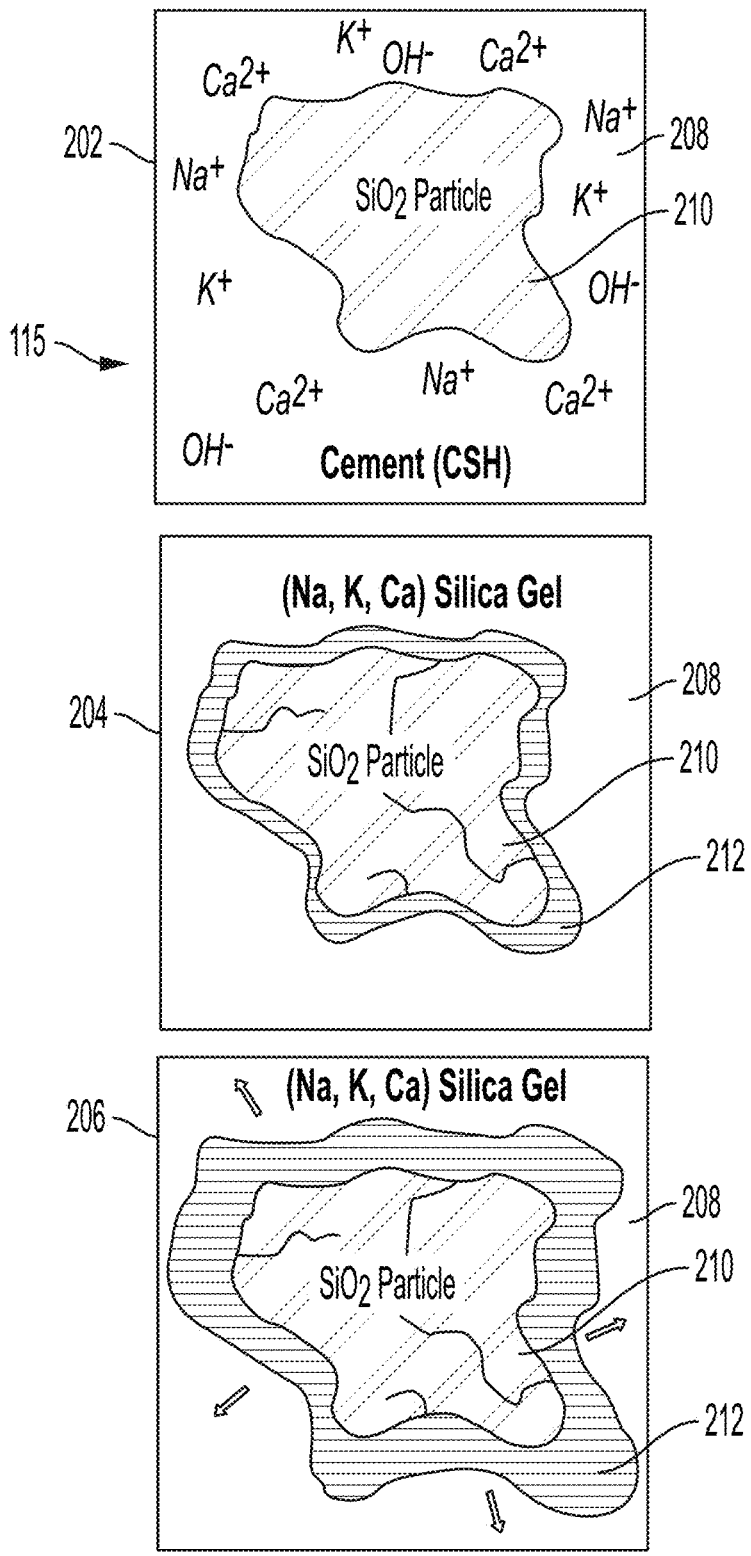
FIG. 2 is a schematic of an alkali-silica reaction expanding a cement mixture according to one example of the present disclosure.

FIG. 2 is a schematic overview showing an alkali-silica reaction and expansion of a cement mixture 115 according to some examples. At block 202, the cement mixture 115 includes a cement material 208 and a silica particle 210. The cement material 208 can include alkali for reacting with silica, such as the Na, K, and Ca ions depicted in FIG. 2. The silica particle 210 can be, as depicted in FIG. 2, a silicon dioxide particle, although other types of particles may be included.

At block 204, the surface of the silica particle 210 reacts with the cement material 208 in an alkali-silica reaction to produce an alkali silica gel 212 that can expand around the silica particle 210. In some examples, the alkali silica gel 212 may expand inside the silica particle 210 to some extent. The cement material 208 may be undergoing a curing process that is causing a contraction of the cement material 208. For example, mix water may be added to the cement mixture 115 to cure the cement mixture 115.

At block 206, the alkali silica gel 212 absorbs mix water from the surrounding cement material 208, causing the alkali silica gel 212 to increase in volume. This in turn causes an expansion of the cement material 208 surrounding the silica particle 210. The expansion of the cement material 208 due to the expansion of the alkali silica gel 212 may be greater than the contraction of the cement material 208 due to the curing process.

In some examples, the whole alkali-silica reaction (after it has progressed to completeness in the presence of sufficient alkali ions available in solution) may be compared to a pozzolanic reaction which is catalyzed by the presence of excessive concentrations of alkali hydroxides in the cement. Other combinations of alkali hydroxides and silica materials beyond those depicted in FIG. 2 may be used. For example, the alkali hydroxides can include NaOH and KOH. A simplified example of a pozzolanic reaction is shown in reaction 1) below. In this reaction, silica reacts with calcium hydroxide, which forms an alkali silica gel 212 of silicate hydrate (CSH) in its final stage.

$$Ca(OH)_2 + H_4SiO_4 \rightarrow Ca^{2+} + H_2SiO_4^{2-} + 2H_2O \rightarrow CaH_2SiO_4 \cdot 2H_2O \qquad 1)$$

Here, for the sake of simplicity, the silicic acid $H_4SiO_4$ (which may be equivalent to $SiO_2 \cdot 2H_2O$) represents the portion of the surface of the silica particle 210 solubilized by soluble alkali hydroxides (NaOH or KOH) at very high pH. It can be represented as follows in reaction 2):

$$2NaOH + H_4SiO_4 \rightarrow Na_2H_2SiO_4 \cdot 2H_2O \qquad 2)$$

The soluble alkali silica gel 212 reaction product ($Na_2H_2SiO_4 \cdot 2\,H_2O$) can then further react with calcium hydroxide ($Ca(OH)_2$) present in the cement mixture 115 to precipitate insoluble calcium silicate hydrates (CSH) and regenerate NaOH for continuing the initial silica dissolution reaction represented in reaction 3):

$$Na_2H_2SiO_4 \cdot 2H_2O + Ca(OH)_2 \rightarrow CaH_2SiO_4 \cdot 2H_2O \text{ (CSH)} + 2NaOH \qquad 3)$$

The soluble sodium or potassium silicate formed by the reactions may be hygroscopic and may consequently swell when they absorb water, such as the water added to the cement mixture during the curing process. When the alkali silica gels 212 form and swell inside the cement mixture 115, they may first expand and occupy the free porosity surrounding the silica particle 210. When the porosity is filled, the alkali silica gel 212 may continue to expand, leading to an increase in hydrostatic pressure surrounding the silica particle 210. By controlling the chemistry, size, and/or concentration of the silica material present in the cement mixture 115, a small amount of expansion of the cement mixture 115 can be induced without causing cracking or degradation of the cement mixture 115.

In some examples, the type of silica material used may be determined based on downhole conditions, such as temperature, as the rate or extent of ASR may be temperature-dependent. For example, if downhole temperatures are high (e.g., 200° F. or greater), it may be desirable for all, a majority, or a portion of the silica material to be a crystalline silica that may slow the ASR rate to decrease the amount of expansion due to the alkali silica gel 212. In other examples where downhole temperatures are lower, such as 199° F. or less, it may be desirable for all, a majority, or a portion of the silica material to be a more pozzolanic material, such as amorphous silica. Silica materials that are more amorphous may dissolve more quickly than silica materials that are more crystalline. Higher rates of dissolution may increase the rate of expansion due to the alkali silica gel 212. In some examples, various ratios of crystalline silica to amorphous silica may be included in the silica present in a cement mixture, such as from 0:1 to 1:0. For example, ratios of crystalline silica to amorphous silica included in the silica present in a cement mixture may be from 1:100 to 1:50, from 1:50 to 1:25, from 1:25 to 1:10, from 1:10 to 1:5, from 1:5 to 1:2, from 1:2 to 1:1, from 1:1 to 1:2, from 1:2 to 1:5, from 1:5 to 1:10, from 1:10 to 1:25, from 1:25 to 1:50, or from 1:50 to 1:100. In some examples, the silica present in a cement mixture may be 100% crystalline silica. In some examples, the silica present in a cement mixture may be 100% amorphous silica.

In some examples, the type of silica material used may be determined based on shrinkage characteristics of the cement material, such as to establish a desired overall shrinkage amount or to counteract expected shrinkage for a particular cement formulation. For example, the curing shrinkage of a cement mixture may be determined based on factors such as cement material particle size and water-to-cement ratio. The type or characteristics of the silica particles can be specifically determined to counteract the amount of curing shrinkage. For example, if the curing shrinkage is determined to be relatively low, the silica particles may be selected to include particles that may limit the ASR rate, such as amber or green silica particles, silica particles containing iron, silica particles containing chromium, or silica particles with a relatively low surface area. Alternatively, if the curing shrinkage is determined to be relatively high, the silica particles may be selected to include particles that may promote or enhance the ASR rate, such as clear silica particles, silica particles lacking iron or chromium, or silica particles with relatively high surface area.

Figure 3:
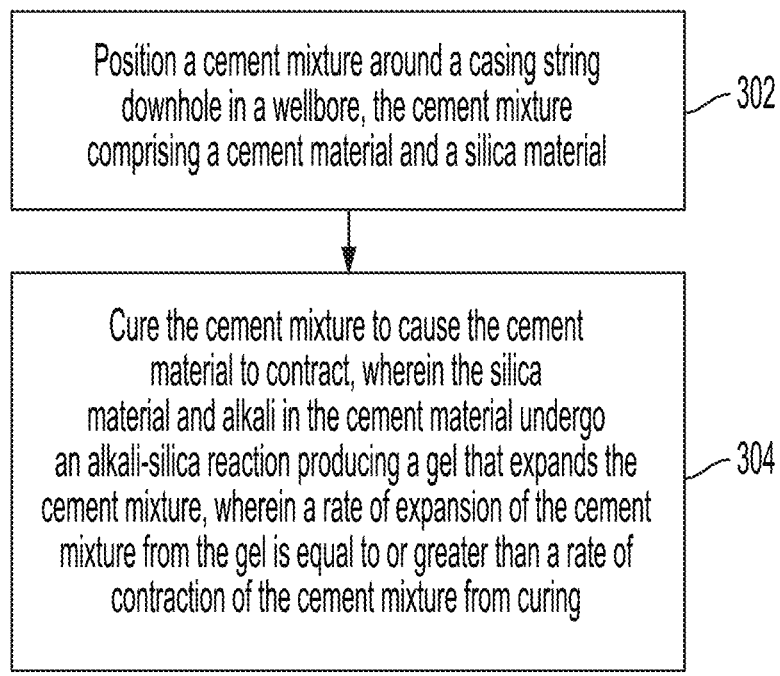
FIG. 3 is a flowchart of a method for expanding a cement mixture via an alkali-silica reaction according to one example of the present disclosure.

FIG. 3 is a flowchart of a method for expanding the cement mixture via the alkali-silica reaction according to one example of the present disclosure. At block 302, a cement mixture is positioned around a casing string downhole in a wellbore. The cement mixture may comprise any cement mixture described herein, such as the cement mixture 115 depicted in FIG. 1. The cement mixture comprises a cement material, such as a cement material containing alkali elements, like sodium (Na), potassium (K), calcium (Ca), or the like, and a silica material. The silica material may be in the form of or comprise particles, such as silica particles 210.

At block 304, the cement mixture is cured to cause the cement material to contract. For example, the cement mixture may be cured with the injection of a mix water. Curing the cement mixture may cause the cement material to harden and contract. As the cement mixture is curing, the alkali in the cement material and the silica material may undergo an ASR. The ASR may produce an alkali silica gel that can expand the cement mixture. The rate of expansion of the cement mixture from the gel may be equal to or greater than a rate of contraction of the cement mixture from curing.

Aspects of the invention may be further understood by reference to the following non-limiting examples.

Example 1—Recycled Glass Particles

The following experiment shows that amorphous recycled glass particles can be utilized to induce the post-set expansion of portland cement.

Figure 4:
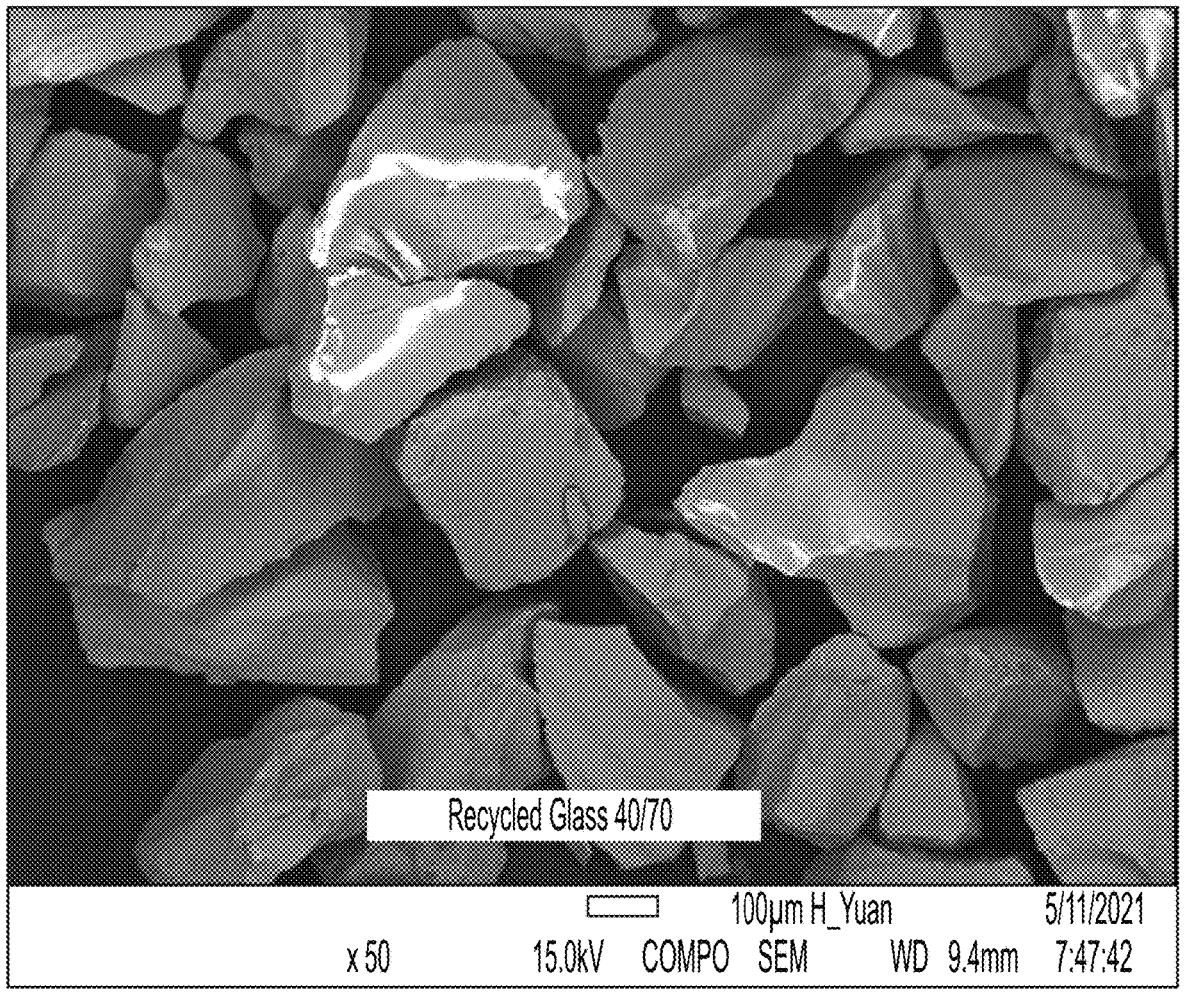
FIG. 4 is a scanning electron micrograph (SEM) image of a sample of recycled glass particles according to one example of the present disclosure.

The glass particles were obtained from Strategic Materials Corporation as Recycled Glass 40/70. The glass particles were analyzed and had the properties shown in Tables 1-3. A Scanning Electron Micrograph (SEM) image of a sample of the glass particles is shown in FIG. 4.

TABLE 1

Oxide Analysis.

| Oxide | Oxide % |
|---|---|
| $Na_2O$ | 15.98 |
| MgO | 0.98 |
| $SiO_2$ | 68.20 |
| $SO_3$ | 0.54 |
| $Al_2O_3$ | 0.92 |
| $K_2O$ | 0.56 |
| CaO | 11.56 |
| $TiO_2$ | 0.11 |
| $Cr_2O_3$ | 0.07 |
| MnO | 0.02 |
| $Fe_2O_3$ | 0.58 |
| SrO | 0.02 |
| BaO | 0.04 |
| LOI | 0.45 |

TABLE 2

X-Ray Diffraction Analysis

| Amorphous (wt. %) | Quartz (wt. %) |
|---|---|
| 98 | 2 |

TABLE 3

| Particle Size Distribution | | |
|---|---|---|
| D10 (μm) | D50 (μm) | D90 (μm) |
| 227.0 | 402.0 | 708.0 |

API Recommended Practice 10B-5 'Determination of shrinkage or expansion under conditions of free access of water at atmospheric pressure—Annular ring test' was followed for the experiments below. Four formulations were prepared and blended into slurries following API procedures. The formulations are shown in Table 4.

TABLE 4

| Sample Slurry Formulations | | | | | |
|---|---|---|---|---|---|
| Material | Units | Slurry 1 | Slurry 2 | Slurry 3 | Slurry 4 |
| Class H Cement | % BWOC | 100.0 | 100.0 | 58.5 | 58.5 |
| Fly Ash | % BWOC | — | — | 34.9 | 34.9 |
| Volcanic ash | % BWOC | — | — | 6.6 | 6.6 |
| Recycled Glass 40/70 | % BWOC | — | 10.0 | — | 10.0 |
| Water | % BWOC | 38.6 | 41.3 | 66.4 | 72.7 |
| Slurry Density | PPG | 16.4 | 16.4 | 13.5 | 13.5 |
| Estimated Relative Slurry Cost | % | 100.0 | 99.2 | 55.1 | 54.9 |

Slurry 1 was a neat portland cement with no additives. Slurry 2 was portland cement formulation which included 10% by weight of cement (% BWOC) Recycled Glass 40/70 on which ASR can occur and consequently expand the cement. Slurry 3 was a pozzolanic/portland cement blend with no expansive additive. Slurry 4 was a pozzolanic/portland cement blend which included 10% BWOC Recycled Glass 40/70 as the ASR expansive additive.

After running the shrinkage/expansion test for seven days, the ring molds were measured and the percent expansion of each sample was calculated according to the procedure and equations in API 10B-5. The determined expansion values for each of the slurries are shown in Table 5.

TABLE 5

| Expansion values after 7 days | |
|---|---|
| Material | 7-Day Expansion (%) |
| Slurry 1 | −0.02 |
| Slurry 2 | 0.32 |
| Slurry 3 | 0.09 |
| Slurry 4 | 0.17 |

As expected, the neat cement, Slurry 1, showed no expansion in this test, but did shrink by 0.02%. Slurry 2 expanded the most of all the ASR expansive additive slurries, with 0.32% expansion. Slurry 3 expanded slightly even with no expansive additive; this was not unexpected since this behavior has been observed in other low-portland cement designs. However, Slurry 4 expanded almost twice as much as Slurry 3, showing that the ASR expansive additive has utility in even low-portland cements. Altogether, these data show that recycled glass is useful as a cement expansion aid. Further, the cost of the slurries which contain the ASR expansive additive (recycled glass) are lower in cost than the slurries that do not. The lower cost is due the addition of slightly more water and relatively lower cost of recycled glass as compared to the other components.

Example 2—Spherical Glass Particles

The following experiment shows that amorphous spherical glass particles and semi-spherical quartz frac sand can be utilized to induce the post-set expansion of portland cement.

Figure 5:
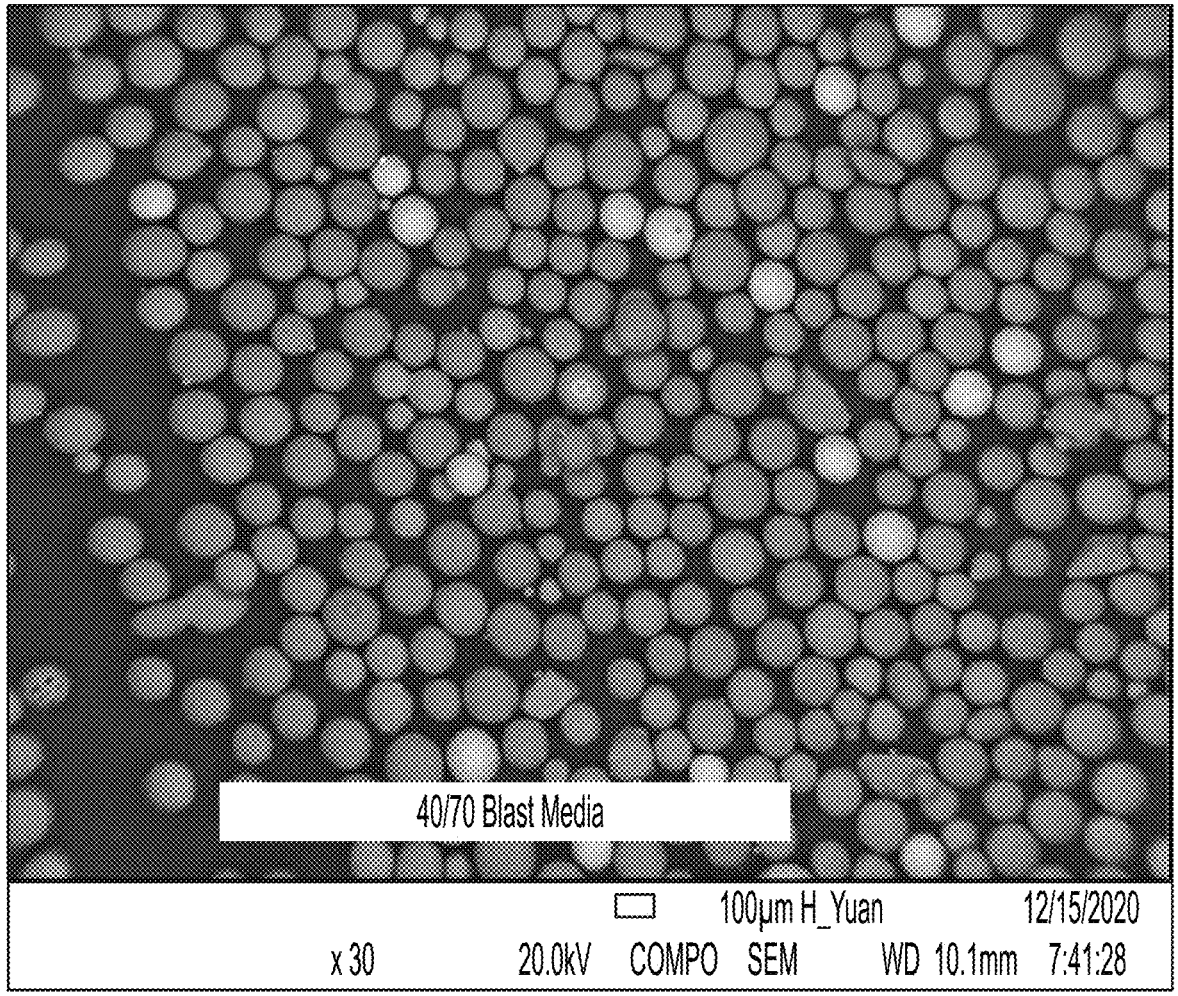
FIG. 5 is a SEM image of a sample of spherical or semi-spherical glass particles according to one example of the present disclosure.

The spherical glass particles were produced by Harbor Freight Tools USA, Inc. under the Central Pneumatic brand and sold as Ground Glass 40/70 Grit Abrasive Media. The glass particles were analyzed and had the following properties: The glass particles were analyzed and had the properties shown in Tables 6-8. A SEM image of a sample of the glass particles is shown in FIG. 5.

TABLE 6

| Oxide Analysis. | |
|---|---|
| Oxide | Oxide % |
| $Na_2O$ | 21.25 |
| MgO | 4.92 |
| $SiO_2$ | 66.75 |
| $SO_3$ | 0.26 |
| Cl | 0.03 |
| $K_2O$ | 1.00 |
| CaO | 4.81 |
| $Fe_2O_3$ | 0.12 |
| SrO | 0.18 |
| BaO | 0.55 |
| LOI | 0.14 |

TABLE 7

| X-Ray Diffraction Analysis Amorphous (wt. %) |
|---|
| 100 |

TABLE 8

| Particle size Distribution | | |
|---|---|---|
| D10 (μm) | D50 (μm) | D90 (μm) |
| 136.0 | 188.0 | 258.0 |

For this testing, the API Recommended Practice 10B-5 'Determination of shrinkage or expansion under conditions of free access of water at atmospheric pressure—Annular ring test' was followed. Four formulations were prepared and blended into slurries following API procedures. The formulations are shown in Table 9.

TABLE 9

| Sample Slurry Formulations | | | | | |
|---|---|---|---|---|---|
| Material | Units | Slurry 5 | Slurry 6 | Slurry 7 | Slurry 8 |
| Class H Cement | % BWOC | 100.0 | 100.0 | 100.0 | 100.0 |
| Expansion Additive | % BWOC | — | 5.0 | — | — |
| Abrasive Media | % BWOC | — | — | 10.0 | — |
| Frac Sand | % BWOC | — | — | — | 20.0 |
| Water | % BWOC | 38.6 | 39.5 | 40.5 | 44.0 |
| Slurry Density | PPG | 16.4 | 16.4 | 16.4 | 16.4 |
| Estimated Relative Slurry Cost | % | 100.0 | 114.6 | 99.2 | — |

Slurry 5 was a neat cement with no additives. Slurry 6 included a typical oilwell cement expansion additive at 5.0%

BWOC loading. Slurry 7 utilized the Ground Glass 40/70 Grit Abrasive Media at 10.0% BWOC loading as particles on which ASR can occur and consequently expand the cement. Slurry 8 used typical 20/40 frac sand (crystalline silica particles between 400 and 800 microns in diameter) on which ASR could occur and expand the cement.

After running the shrinkage/expansion test for seven days, the ring molds were measured and the % expansion of each sample was calculated according to the procedure and equations in API 10B-5. The determined expansion values for each of the slurries are shown in Table 10.

TABLE 10

Expansion values after 7 days

| Material | 7-Day Expansion (%) |
| --- | --- |
| Slurry 5 | −0.02 |
| Slurry 6 | 0.5 |
| Slurry 7 | 0.2 |
| Slurry 8 | 0.1 |

As expected, the neat cement, Slurry 5, showed negative expansion (shrinkage) in this test. Slurry 6 expanded the most at 0.5% expansion. Slurries 7 and 8 (which contain amorphous and crystalline silica, respectively), showed non-zero expansion. Consequently, this data shows that these materials are useful as cement expansion aids. Furthermore, the slurry cost using conventional expansion additive is about 15% more than using the abrasive media comprising glass particles where ASR contributes to expansion.

In some aspects, method, system, and apparatus for expanding a cement mixture with an alkali-silica reaction downhole in a wellbore are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a method comprising: positioning a cement mixture around a casing string downhole in a wellbore, the cement mixture comprising a cement material and a silica material; and curing the cement mixture to cause the cement material to contract, wherein the silica material and alkali in the cement material undergo an alkali-silica reaction producing a gel that expands the cement mixture, and wherein a rate of expansion of the cement mixture from the gel is equal to or greater than a rate of contraction of the cement mixture from curing.

Example 2 is the method of examples 1, wherein the silica material is homogeneously distributed in the cement mixture.

Example 3 is the method of examples 1-2, further comprising: determining a curing shrinkage of the cement material; and determining, based on the curing shrinkage, a surface area for the plurality of silica particles.

Example 4 is the method of example 3, further comprising: determining a curing shrinkage of the cement material; and determining, based on the curing shrinkage, a metal content or color for the plurality of silica particles.

Example 5 is the method of examples 3-4, wherein the rate of expansion of the cement mixture from the gel is based on a metal content or color of the plurality of silica particles.

Example 6 is the method of examples 3-5, wherein the plurality of silica particles have a D50 diameter or D50 cross-sectional dimension that is greater than 100 microns.

Example 7 is the method of examples 1-6, wherein the silica material comprises silica lime glass, borosilicate glass, volcanic glass, rhyolitic glass, dacitic glass, latitic glass, andesite glass, cryptocrystalline devitrification products, siliceous glass, synthetic siliceous glass, crystalline silica, quartz, opal, chalcedony, cristobalite, tridymite, opaline cherts, chalcedonic cherts, quartzose cherts, siliceous limestones, rhyolites and tuffs, dacites and tuffs, andesite and tuffs, siliceous shales, opaline concretions, siliceous dolomites, or phyllites.

Example 8 is a system comprising: a casing string positionable downhole in a wellbore; and a cement mixture positionable between the casing string and the wellbore, the cement mixture comprising: a cement material that is curable to produce a contraction of the cement mixture; and a silica material, the silica material reactable in an alkali-silica reaction with alkali in the cement material while curing to produce a gel, the gel being positionable to expand the cement mixture, wherein a rate of expansion of the cement mixture from the gel is equal to or greater than a rate of contraction of the cement mixture from curing.

Example 9 is the system of example 8, wherein the silica material is homogeneously distributed in the cement mixture.

Example 10 is the system of examples 8-9, wherein the silica material comprises a plurality of silica particles, a plurality of spherical silica particles, a plurality of semi-spherical silica particles, or a plurality of non-spherical silica particles.

Example 11 is the system of example 10, wherein the plurality of silica particles comprises clear silica particles, green silica particles, or amber silica particles.

Example 12 is the system of examples 10-11, wherein the plurality of silica particles comprises silica particles containing chromium or silica particles containing iron.

Example 13 is the system of examples 10-12, wherein the plurality of silica particles have a D50 diameter or D50 cross-sectional dimension that is greater than 100 microns.

Example 14 is the system of examples 8-13, wherein the silica material comprises silica lime glass, borosilicate glass, volcanic glass, rhyolitic glass, dacitic glass, latitic glass, andesite glass, cryptocrystalline devitrification products, siliceous glass, synthetic siliceous glass, crystalline silica, quartz, opal, chalcedony, cristobalite, tridymite, opaline cherts, chalcedonic cherts, quartzose cherts, siliceous limestones, rhyolites and tuffs, dacites and tuffs, andesite and tuffs, siliceous shales, opaline concretions, siliceous dolomites, or phyllites.

Example 15 is a cement mixture comprising: a cement material that is curable to produce a contraction of the cement mixture; and a silica material, the silica material reactable in an alkali-silica reaction with alkali in the cement material while curing to produce a gel, the gel being positionable to expand the cement mixture, wherein a rate of expansion of the cement mixture from the gel is equal to or greater than a rate of contraction of the cement mixture from curing.

Example 16 is the cement mixture of example 15, wherein the silica material is homogeneously distributed in the cement mixture.

Example 17 is the cement mixture of examples 15-16, wherein the silica material comprises a plurality of silica particles, a plurality of spherical silica particles, a plurality of semi-spherical silica particles, or a plurality of non-spherical silica particles.

Example 18 is the cement mixture of example 17, wherein the plurality of silica particles comprises clear silica particles, green silica particles, or amber silica particles.

Example 19 is the cement mixture of examples 17-18, wherein the plurality of silica particles comprises silica particles containing chromium or silica particles containing iron.

Example 20 is the cement mixture of examples 17-19, wherein the plurality of silica particles have a D50 diameter or D50 cross-sectional dimension that is greater than 100 microns.

Example 21 is the method of examples 1-7, wherein the cement mixture is the cement mixture of examples 17-20.

Example 22 is the system of examples 8-14, wherein the cement mixture is the cement mixture of examples 17-20.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
   positioning an expanding cement mixture around a casing string downhole in a wellbore, the expanding cement mixture comprising a cement material and a silica material, wherein the silica material comprises a plurality of recycled amorphous silica particles that have a D50 diameter or a D50 cross-sectional dimension that is greater than 100 microns; and
   curing the expanding cement mixture to cause the cement material to contract and the silica material and alkali in the cement material undergo an alkali-silica reaction producing an expanding gel that causes a non-zero expansion of the expanding cement mixture, and wherein an amount, a porosity, a surface area, a sphericity, a concentration, a particle size, or composition of the silica material in the expanding cement mixture is selected so that a rate of expansion of the expanding cement mixture from the expanding gel is equal to or greater than a rate of contraction of the expanding cement mixture from curing.

2. The method of claim 1, wherein the silica material is homogeneously distributed in the expanding cement mixture.

3. The method of claim 1, wherein the silica material comprises a plurality of silica particles, a plurality of spherical silica particles, a plurality of semi-spherical silica particles, or a plurality of non-spherical silica particles.

4. The method of claim 3, further comprising:
   determining a curing shrinkage of the cement material; and
   determining, based on the curing shrinkage, a surface area for the plurality of silica particles.

5. The method of claim 3, further comprising:
   determining a curing shrinkage of the cement material; and
   determining, based on the curing shrinkage, a metal content or color for the plurality of silica particles.

6. The method of claim 1, wherein the silica material comprises silica lime glass, borosilicate glass, volcanic glass, rhyolitic glass, dacitic glass, latitic glass, andesite glass, cryptocrystalline devitrification products, siliceous glass, synthetic siliceous glass, crystalline silica, quartz, opal, chalcedony, cristobalite, tridymite, opaline cherts, chalcedonic cherts, quartzose cherts, siliceous limestones, rhyolites and tuffs, dacites and tuffs, andesite and tuffs, siliceous shales, opaline concretions, siliceous dolomites, or phyllites.

7. The method of claim 1, wherein the plurality of recycled amorphous silica particles are present in the expanding cement mixture in a concentration of between 15% to 50% by weight of cement.

8. A system comprising:
   a casing string positionable downhole in a wellbore; and
   an expanding cement mixture positionable between the casing string and the wellbore, the expanding cement mixture comprising:
      a cement material that is curable to produce a contraction of the expanding cement mixture; and
      a silica material, the silica material reactable in an alkali-silica reaction with alkali in the cement material while curing to produce an expanding gel configured to cause anon-zero expansion of the expanding cement mixture, wherein an amount, a porosity, a surface area, a sphericity, a concentration, a particle size, or composition of the silica material in the expanding cement mixture is sufficient so that a rate of expansion of the expanding cement mixture from the expanding gel is equal to or greater than a rate of contraction of the expanding cement mixture from curing, wherein the silica material comprises a plurality of recycled amorphous silica particles that have a D50 diameter or a D50 cross-sectional dimension that is greater than 100 microns.

9. The system of claim 8, wherein the silica material is homogeneously distributed in the expanding cement mixture.

10. The system of claim 8, wherein the silica material comprises a plurality of silica particles, a plurality of spherical silica particles, a plurality of semi-spherical silica particles, or a plurality of non-spherical silica particles.

11. The system of claim 10, wherein the plurality of silica particles comprises clear silica particles, green silica particles or amber silica particles.

12. The system of claim 10, wherein the plurality of silica particles comprises silica particles containing chromium or silica particles containing iron.

13. The system of claim 8, wherein the silica material comprises silica lime glass, borosilicate glass, volcanic glass, rhyolitic glass, dacitic glass, latitic glass, andesite glass, cryptocrystalline devitrification products, siliceous glass, synthetic siliceous glass, crystalline silica, quartz, opal, chalcedony, cristobalite, tridymite, opaline cherts, chalcedonic cherts, quartzose cherts, siliceous limestones, rhyolites and tuffs, dacites and tuffs, andesite and tuffs, siliceous shales, opaline concretions, siliceous dolomites, or phyllites.

14. The system of claim 8, wherein the plurality of recycled amorphous silica particles are present in the expanding cement mixture in a concentration of between 15% to 50% by weight of cement.

15. An expanding cement mixture comprising:
   a cement material that is curable to produce a contraction of the expanding cement mixture; and
   a silica material, the silica material reactable in an alkali-silica reaction with alkali in the cement material while curing to produce an expanding gel configured to cause anon-zero expansion of the expanding cement mixture, wherein an amount, a porosity, a surface area, a sphericity, a concentration, a particle size, or composition of the silica material in the expanding cement mixture is sufficient so that a rate of expansion of the expanding cement mixture from the expanding gel is equal to or greater than a rate of contraction of the expanding cement mixture from curing, wherein the silica material comprises a plurality of recycled amorphous silica particles that have a D50 diameter or a D50 cross-sectional dimension that is greater than 100 microns.

16. The expanding cement mixture of claim 15, wherein the silica material is homogeneously distributed in the expanding cement mixture.

17. The expanding cement mixture of claim 15, wherein the silica material comprises a plurality of silica particles, a plurality of spherical silica particles, a plurality of semi-spherical silica particles, or a plurality of non-spherical silica particles.

18. The expanding cement mixture of claim 17, wherein the plurality of silica particles comprises clear silica particles, green silica particles, or amber silica particles.

19. The expanding cement mixture of claim 17, wherein the plurality of silica particles have a D50 diameter or D50 cross-sectional dimension that is greater than 350 microns.

20. The expanding cement mixture of claim 17, wherein the plurality of recycled amorphous silica particles are present in the expanding cement mixture in a concentration of between 15% to 50% by weight of cement.

* * * * *